United States Patent [19]
Windstrup

[11] 3,739,904
[45] June 19, 1973

[54] MODULAR CONVEYOR SUPPORT ASSEMBLY

[75] Inventor: Robert F. Windstrup, Chicago, Ill.

[73] Assignee: Continental Can Company, Inc., New York, N.Y.

[22] Filed: Oct. 20, 1971

[21] Appl. No.: 190,721

[52] U.S. Cl. ............................................. 198/204
[51] Int. Cl. .......................................... B65g 15/60
[58] Field of Search ................................... 198/204

[56] References Cited
UNITED STATES PATENTS

| | | | |
|---|---|---|---|
| 3,508,642 | 4/1970 | Standley | 198/204 |
| 3,596,752 | 8/1971 | Garvey | 198/204 |
| 3,368,666 | 2/1968 | Stone | 198/204 |

FOREIGN PATENTS OR APPLICATIONS

| 203,964 | 11/1956 | Australia | 198/204 |
|---|---|---|---|

Primary Examiner—Richard E. Aegerter
Assistant Examiner—Joseph E. Valenza
Attorney—Diller, Brown, Ramik & Holt

[57] ABSTRACT

This disclosure relates to a modular conveyor support assembly adapted for use with different types of conveyors, such as steel chains, plastic chains, cables, etc., which offers stiffness in bending and, due to a unique design and standardization of parts such as guides, locating pins, conveyor run supports, etc., a minimum of manual labor and the time incident thereto is necessary for assembly or disassembly. The open construction facilitates cleaning, which is vital in certain food processing installations.

27 Claims, 10 Drawing Figures

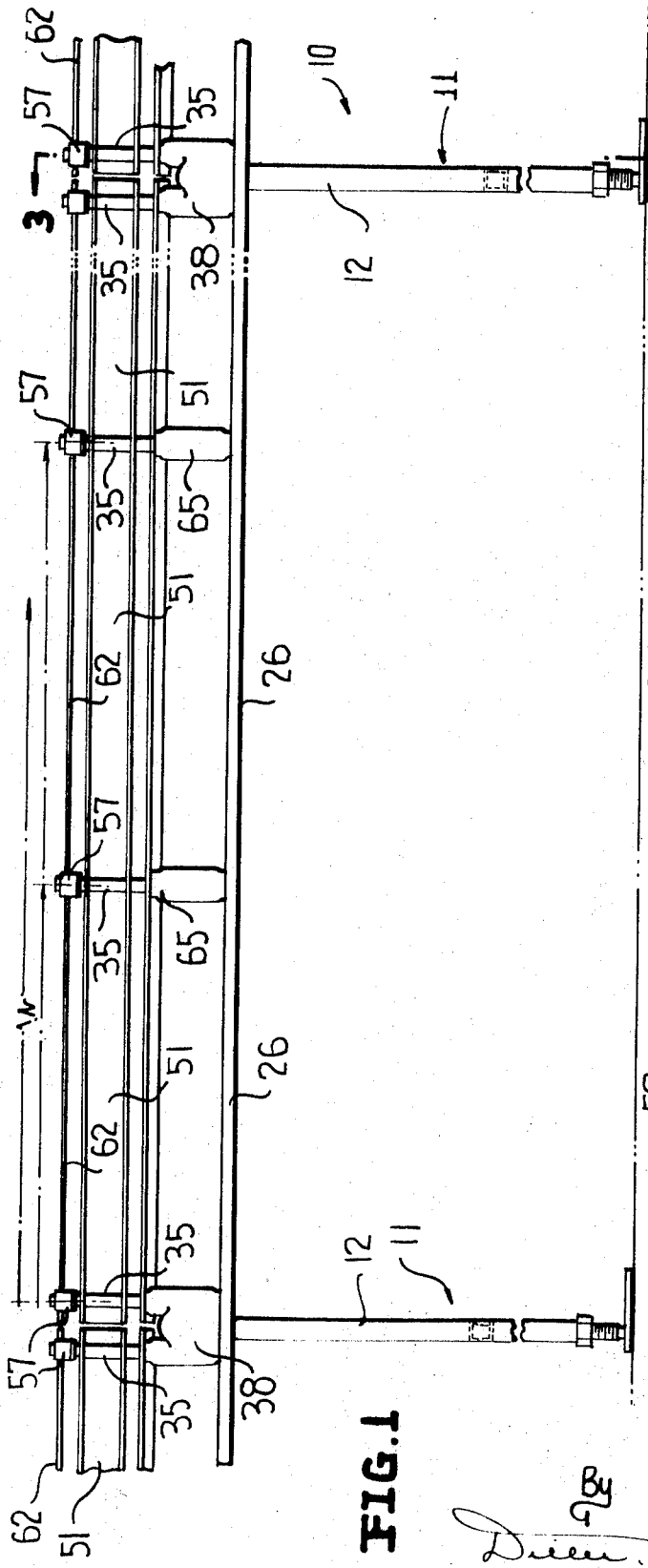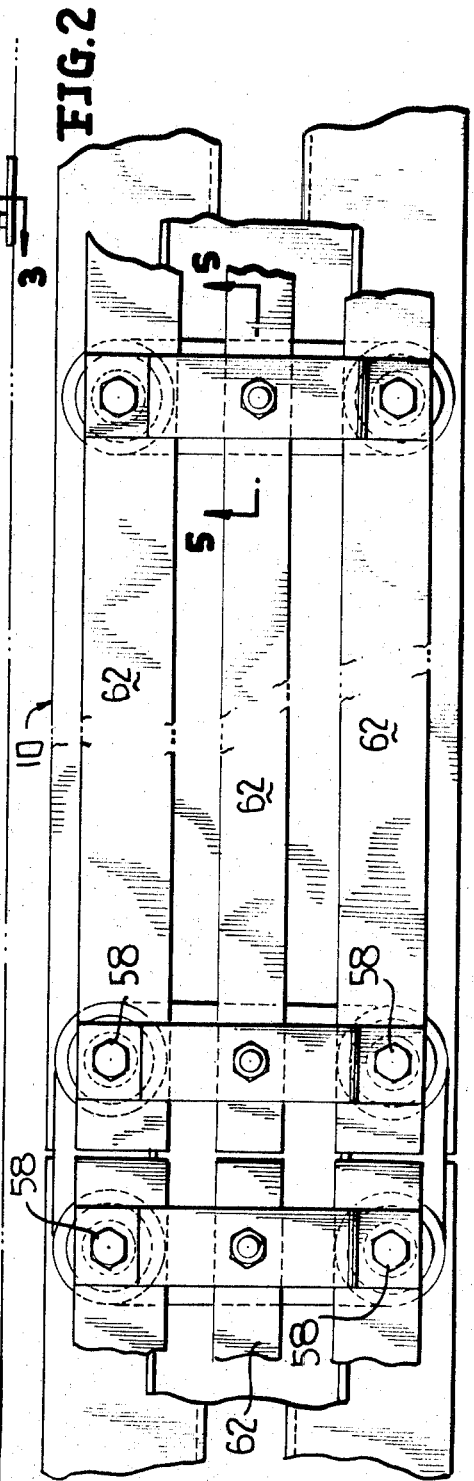
PATENTED JUN 19 1973
3,739,904
SHEET 1 OF 4
FIG.1
FIG.2
INVENTOR
ROBERT F. WINDSTRUP
By
Dieter, Brown, Ramik & Holt
ATTORNEYS

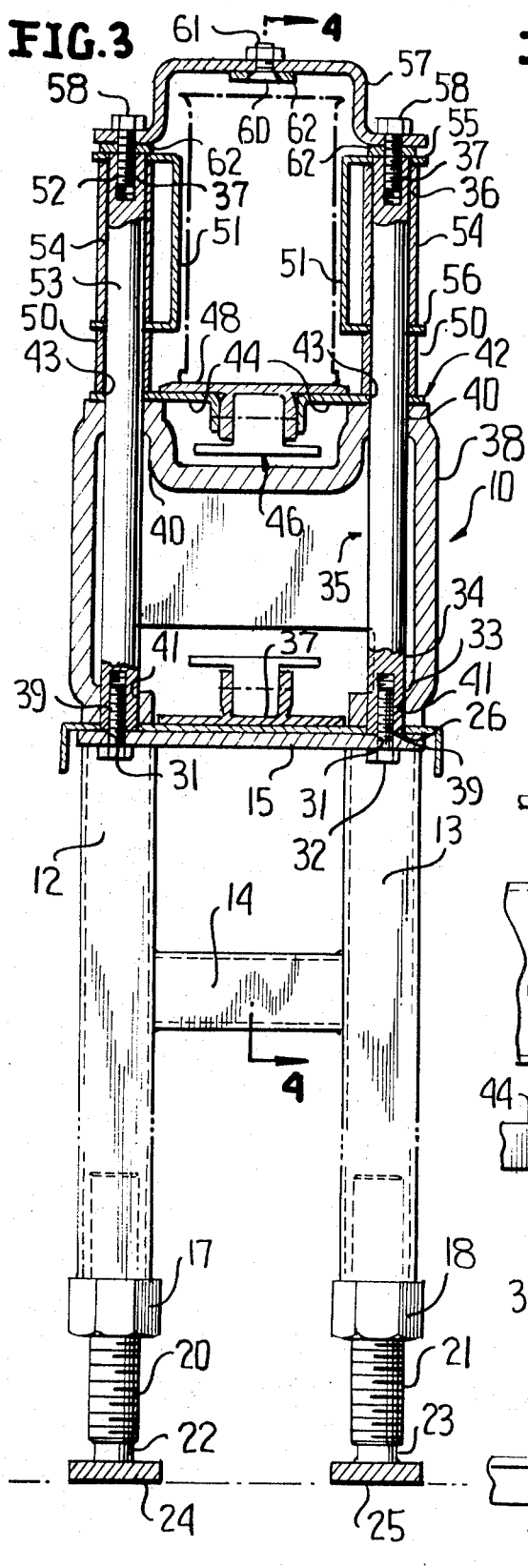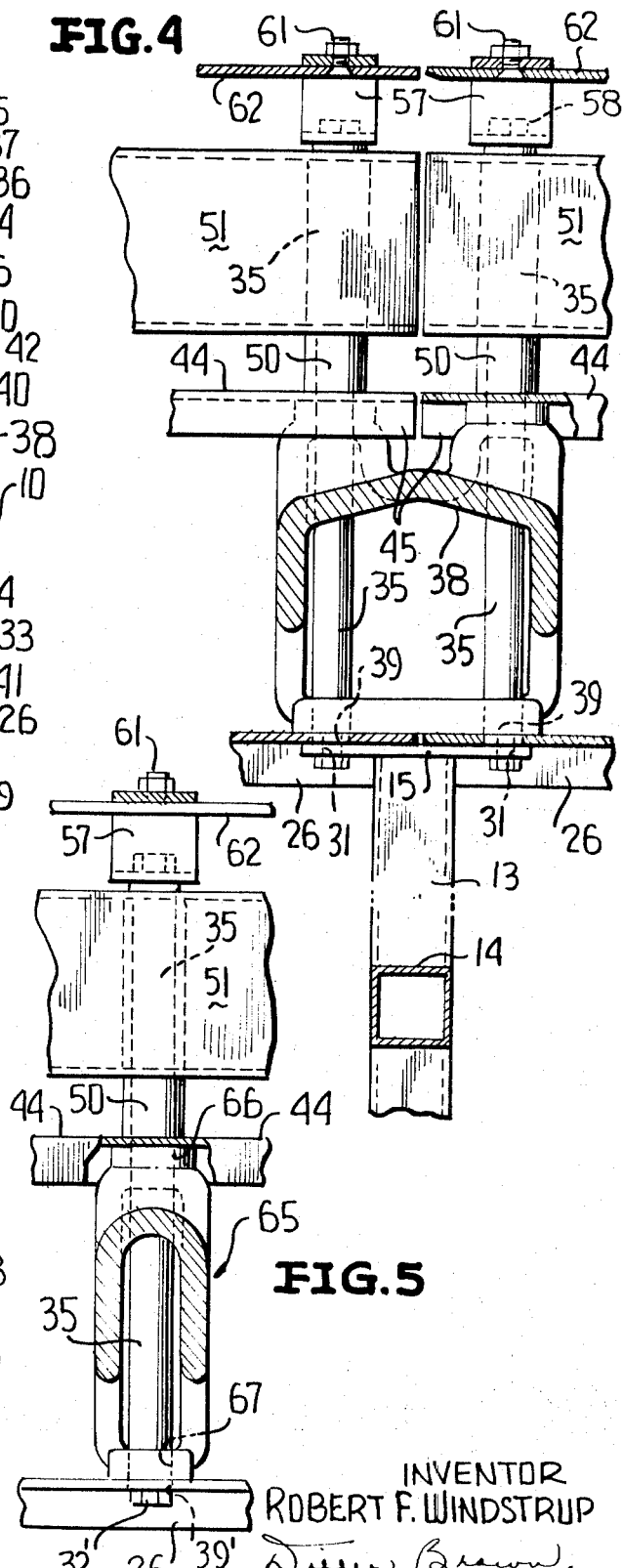

INVENTOR
ROBERT F. WINDSTRUP

ATTORNEYS

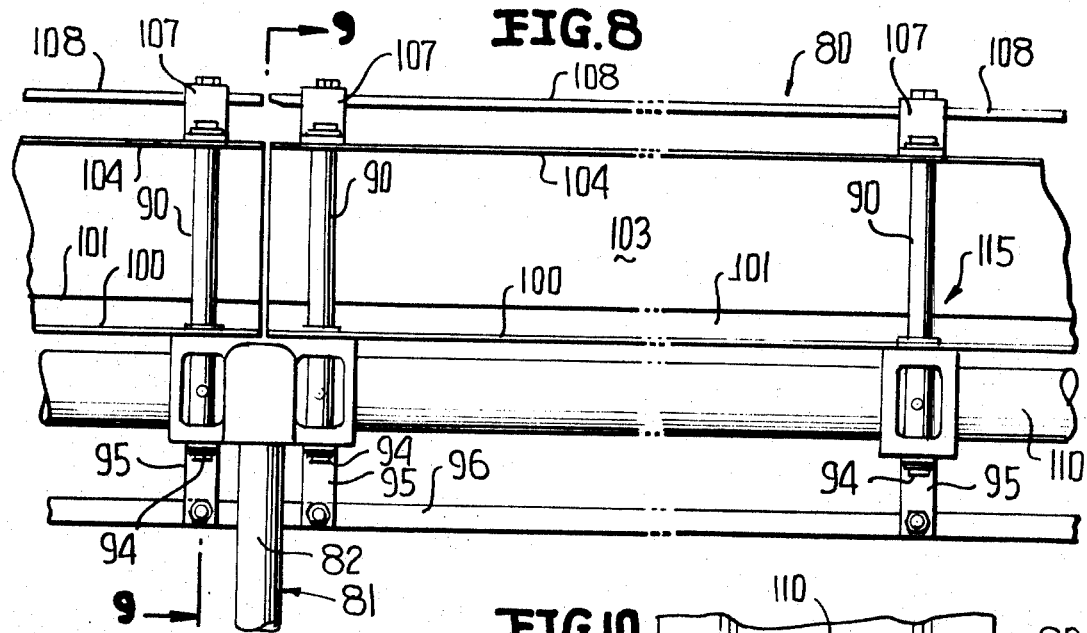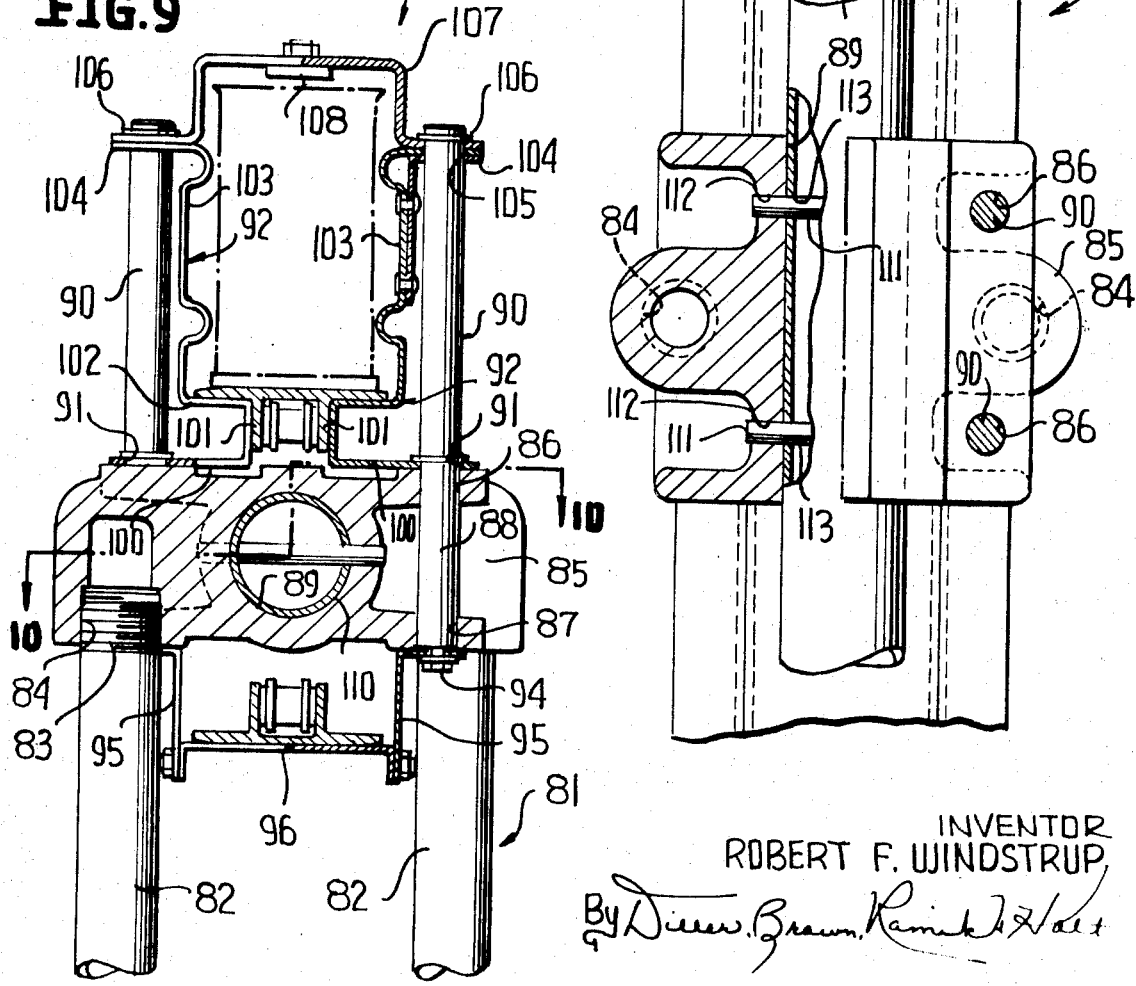

MODULAR CONVEYOR SUPPORT ASSEMBLY

Efforts have been made over the years to standardize conveyor systems and particularly the frames or supporting structure for many reasons among which are rapidity of assembly and disassembly, rigidity with its attendant constant cross section for article passage, and ease of convertibility when initially used to convey one size or type of article but is subsequently converted for conveying other articles or different sizes of the original articles. Unfortunately, it is not uncommon for manufacturers to treat conveyor systems with disinterest or little interest since such "hardware" is thought commonplace: It is therefore not unusual to see highly sophisticated production machines being fed and discharged by what can be best described as old and rickity conveyors resulting in continued jamming and thus expensive down-time for subsequent necessary refurbishing or repairs. Just as common is the modernization of production machines in-line-production lines with makeshift rearrangements of the old conveyor systems which again results in jamming and/or slower production speeds and/or article damage.

In keeping with the foregoing, it is a primary object of the present invention to provide a novel conveyor support assembly which is of a relatively universal modular construction affording rapid assembly or disassembly and conveyor rigidity to assure maximum speed of article conveyance with minimum article damage or jamming thus directly increasing productivity by decreasing machine down-time, the latter being achieved through the use of side rails as rigidifying support structure.

A further object of this invention is to provide a novel conveyor support assembly which includes a vertical pedestal, a pair of spaced guide pins secured at lower terminal end portions thereof to the pedestal, first spacer means telescopically receiving the guide pins, platform means for supporting a conveyor run telescopically receiving the guide pins, second spacer means above the platform means and also telescopically receiving the guide pins, a guide rail telescopically receiving each guide pin and resting upon the second spacer means and means maintaining these components in rigid assembly while permitting the various components to be rapidly disassembled and replaced to vary such things as guide rail to guide rail distance, guide rail to platform distance, an article cross section contoured by the use of alternate guide rail configurations.

A further object of this invention is to provide a novel conveyor support assembly of the type heretofore described wherein the first spacer means are cast metal blocks having accurately drilled bores which telescopically receive the locating or guide pins.

Another object of this invention is to provide a novel conveyor support assembly in which the second spacer means are annular sleeves which can be of varied heights to alter the platform to guide rail distance, as desired.

Still another object of this invention is to provide a novel conveyor support assembly in which open style construction makes wash-down or cleaning particularly effective.

Still another object of this invention is to provide a novel conveyor support assembly wherein at most four and as little as two bolts need be removed at each pedestal to remove any particular size or shape first and second spacer means, platform means, the spanning means and the guide rails, and substitute like though differently sized or contoured elements to rapidly convert the conveyor support assembly for a different use and/or article size.

With the above and other objects in view that will hereinafter appear, the nature of the invention will be more clearly understood by reference to the following detailed description, the appended claimed subject matter, and the several views illustrated in the accompanying drawings.

In the drawings:

FIG. 1 is a side elevational view of a novel conveyor support assembly of this invention, and illustrates two vertical pedestals, each of which carries four locating pins which in turn form the base for modular components of the system such as, spacers, guide rails, spanning elements, conveyor run supporting platforms, etc.

FIG. 2 is a fragmentary top plan view of the conveyor support assembly of FIG. 1, and illustrates a plurality of top guide rails extending between and connected to threaded upper terminal end portions of the locating pins.

FIG. 3 is an enlarged fragmentary sectional view taken generally along line 3—3 of FIG. 1, and more clearly illustrates the manner in which the locating pins are secured at threaded lower terminal end portions to a base plate of the pedestal, two pair of spacer means telescopically receiving the locating pins, conveyor run support platform means between the spacer means and likewise telescopically receiving the locating pins, and a spanning element threadably connected to upper terminal end portions of the locating pins for supporting a top rail to control cans at high speeds.

FIG. 4 is a fragmentary sectional view taken generally along line 4—4 of FIG. 3, and illustrates further details of the lower spacer means cross section, the guide rails, and the conveyor run support platforms.

FIG. 5 is a sectional view taken generally along line 5—5 of FIG. 2, and illustrates the manner in which the assembly may be reinforced between any pair of vertical pedestals by one or more pairs locating pins and associated modular components, i.e., first and second spacer means, guide rails, etc.

Figure 6:
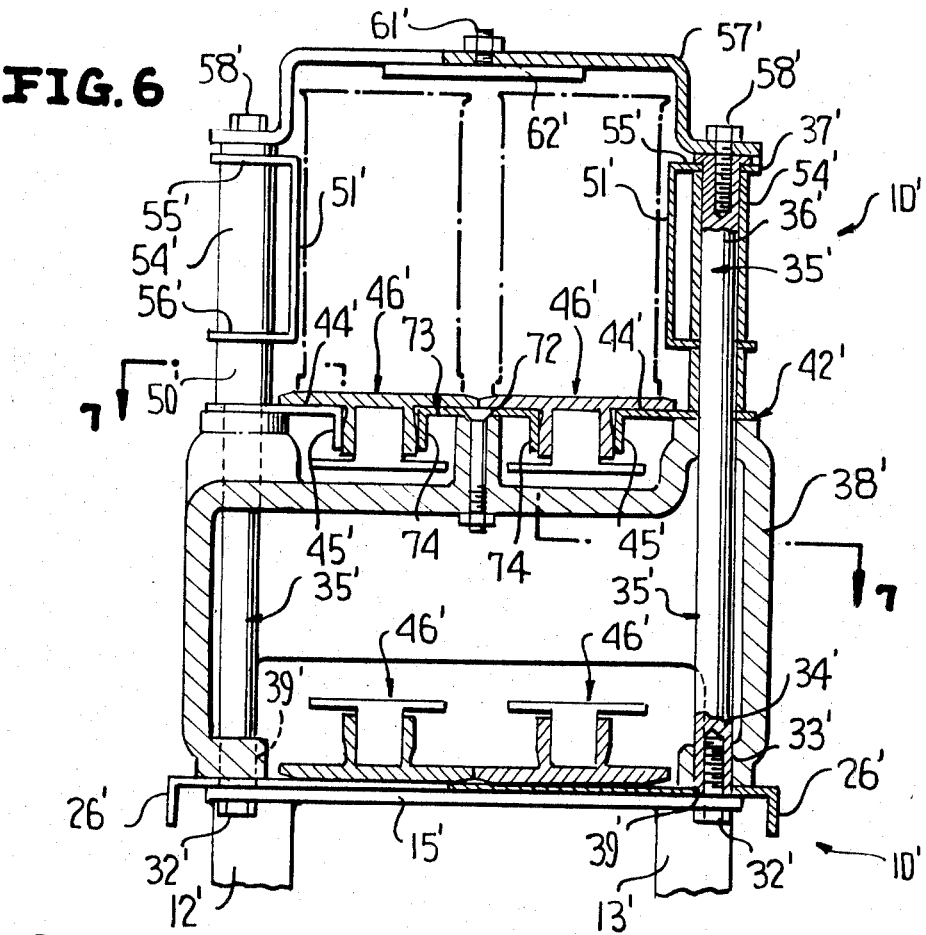

FIG. 6 is an enlarged fragmentary sectional view similar to the upper portion of FIG. 3 but taken through another modular conveyor support assembly which differs from that of FIGS. 1–5 in that two pairs of conveyor run supporting platforms are supported by the lower spacer means with each conveyor supporting platform having a common central supporting plate underlingly supported by and secured to bosses of the spacer.

Figure 7:
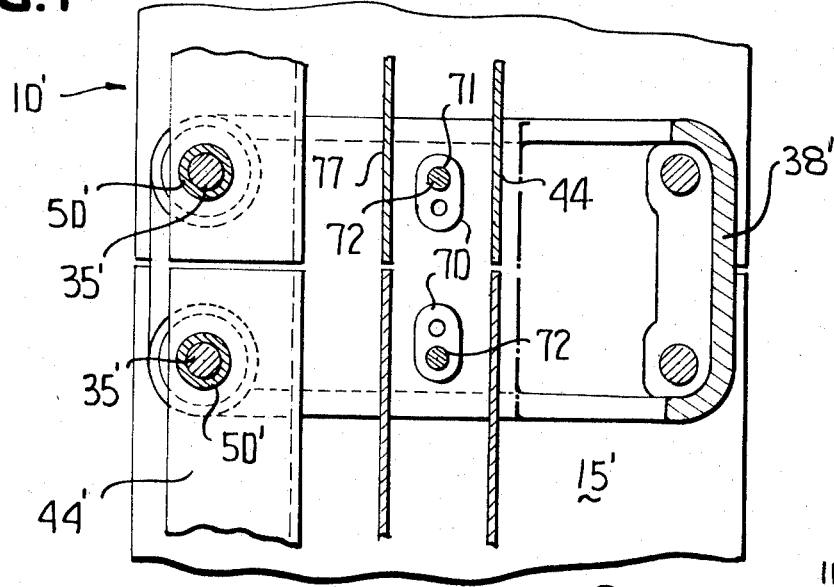

FIG. 7 is a fragmentary sectional view taken generally along line 7—7 of FIG. 6, and illustrates the bosses of the lower spacer which serve to support the conveyor platforms.

FIG. 8 is a fragmentary side elevational view of another conveyor support assembly constructed in accordance with this invention, and illustrates a plurality of locating pins upon which are telescopically received guide rails, conveyor platforms, spacers, and other components of the assembly.

FIG. 9 is an enlarged fragmentary sectional view taken generally along the line 9—9 of FIG. 8, and more clearly illustrates the manner in which the components of the assembly are constructed in a modular fashion.

FIG. 10 is a sectional view taken generally along line 10—10 of FIG. 9, and illustrates the manner in which a pair of vertical uprights serve as a pedestal of the assembly and a central tubular reinforcing member.

A modular conveyor support assembly constructed in accordance with this invention is illustrated in FIGS. 1–5 of the drawings, and is generally designated by the reference numeral 10. The assembly 10 includes a plurality of identical vertical pedestals 11 (FIG. 1), each of which includes a generally H-shaped configuration defined by a pair of metallic tubes or pipes 12, 13 joined together by a pipe 14 medially of the tube ends (unnumbered). A flat plate 15 is welded to the upper end (unnumbered) of the pipes 12, 13. At the lower ends of the pipes 12, 13 are welded internally threaded nuts 17, 18 respectively, in which are threaded threaded portions 20, 21, respectively, of respective legs 22, 23, having respective feet 24, 25. The threaded portions 20, 21 permit the pedestals 11 to be adjusted, as necessary.

A relatively long inverted shallow U-shaped base member 26 spans two or more of the pedestals 11 and is secured thereto by bolts 32 and locating pins 35 having lower end portions 34 which pass through openings 39 of the base member 26, as will be noted more fully hereinafter.

The base plate 15 and the base member 26 have four aligned or registered openings 31, 39, respectively, through which upwardly project the bolts 32 (FIGS. 3 and 4). The bolts 32 are threaded into axial threaded bores 33 formed in the lower terminal end portions 34 of the cylindrical upright supporting members or locating pins 35 having like upper terminal end portions 36 provided with threaded axial bores 37.

After the four locating pins 35 have been secured atop the plate 15 by the bolts 32 first spacer or support means 38 which is a hollow member preferably formed from cast metallic material is telescoped upon the locating pins 35 by means of cored or drilled openings 40 at upper end portions of the spacer 38 and aligned lower openings 41.

Thereafter platform means, generally designated by the reference numeral 42, are telescoped upon the locating pins 35 by means of openings 43. The platform means 42 are in the form of two relatively long plates 44, 44 having depending flanges 45 which are in spaced relationship to each other. The plates or platforms 44, 44 preferably span a distance between the adjacent pedestals 11, 11.

A conveyor of any conventional type, which is generally designated by the reference numeral 46 is suitably entrained about drive and/or idler pulleys (not shown) and upper supports or links 48 are supported by the platforms 44, 44, in a manner best illustrated in FIG. 3, while the base member 26 functions as a support for the return or lower run of the conveyor 46.

Second spacer or support means 50, 50 in the form of annular sleeves are telescoped upon the locating pins or rods 35 and function to support generally U-shaped guide rails 51 a predetermined distance above the conveyor support platform 42. The guide rails 51, 51 have upper and lower openings 52, 53, respectively, for telescopically receiving the locating pins 35 and additional reinforcing sleeves 54 are telescoped upon each of the locating pins 35 and each is thus sandwiched between arms 55, 56 of the guide rails 51.

The entire assembly is rigidified by a U-shaped spanning member 57 which is secured by bolts 58 threaded within the threaded bores 37 in the locating pins 35. Each spanning member 57 includes an aperture 60 through which passes a bolt 61. The bolts secure upper guide rails 62 to the underside of adjacent spanning members 57. The guide rails 62, as well as the guide rails 51, 51, preferably span the distance between the adjacent locating pins 35 of adjacent pedestals 11, as is readily apparent from FIG. 1 of the drawings.

Reference is now made to FIGS. 1, 2 and 5 of the drawings which illustrate spacer means 65 similar to the spacer means 38 but being constructed to receive two rather than four locating pins 35. One or more of such identical spacers 65 are positioned between adjacent pedestals 11, as is illustrated in FIG. 1, to additionally rigidify the assembly 10. Each spacer or support 65 is likewise telescoped upon two of the locating pins 35 by means of upper cored or drilled openings 66 and lower openings 67. As thus positioned the spacer 65 functions to support thereupon the remaining components of the assembly heretofore described, namely, the platforms 44, the spacers 50, the guide rails 51 and 62, and the spanning members 57 secured to the locating pins 35 by the bolts 58. The platforms 44, the spacers 50, the reinforcing sleeves 54 and the guide rails 51 are, of course, telescoped upon the locating pins 35 of FIG. 5 just as described with respect to FIGS. 3 and 4.

Reference is now made to FIGS. 6 and 7 of the drawings which illustrate another conveyor assembly identified with primed reference characters which indicate structure equivalent to that of the conveyor assembly 10 of FIGS. 1–5. However, the conveyor assembly 10' of FIGS. 6 and 7 differs therefrom in that spacer or support means 38' include two centrally located upstanding bosses 70 having bores 71 which receive bolts 72, in the manner best illustrated in FIG. 6. Each of the bolts 72 passes through a central platform portion 73 of platform means 42'. The platform 73 has depending legs 74 which define spaces (unnumbered) with adjacent legs 45' of the plates or platforms 44'. Thus, in this embodiment of the invention the conveyor assembly 10' is essentially constructed wider to accommodate two conveyors 46', 46' whereby two rows of articles can be conveyed, as desired. Moreover, this is accomplished by (1) a different size spacer 38' having bosses 70, (2) the bolts 72 associated therewith, and (3) the central platform or plate 73. However, as compared to the conveyor support assembly 10, all remaining components are identical, thus indicating the manner in which changes and/or conversions can be made due to this modular and standardized construction.

Reference is now made to FIGS. 8–10 of the drawings which disclose another conveyor support assembly 80 which includes a plurality of pedestals 81, only one of which is illustrated. However, the pedestals 81 are spaced from each other just as in the case of the pedestals 11 and each is defined by a pair of tubular legs 82 whose upper threaded end portions 83 are threaded into threaded bores 84 of a support or spacer member 85 which includes at each side thereof upper and lower aligned openings or bores 86, 87, respectively, and a central bore 89 whose axis is normal thereto.

Lower end portions 88 of vertical supporting members or locating pins 90 are received in the bores 86, 87, and also pass through openings 91 of means 92 which perform a triple function to be described hereinafter.

A split annular clip 93 is received in an outwardly opening circumferential groove (not shown) of each locating pin 90 to maintain the same in the position best illustrated in the right hand side of FIG. 9. Each pin 90 is prevented from being withdrawn from the openings 86, 87 by bolts 94 received in axial threaded bores (not shown) of the lower end portions 88. The bolts 94 additionally function to suspend two generally L-shaped angle irons 95 having a lower conveyor run platform 96 secured thereto. The platform 96 preferably extends the entire distance between adjacent pedestals 81, as is best apparent from FIG. 8.

The means 92 is preferably though not necessarily constructed from a single sheet of material which extends between each two adjacentmost locating pins 90 of adjacent pedestals 81. The means 92 includes a lower horizontal portion 100, a lower vertical portion 101, a medial horizontal portion 102, another vertical portion 103, and an uppermost horizontal portion 104. The opening 91 heretofore to is formed in the lowermost horizontal portion 100 while a similar opening 105 is formed in the upper horizontal portion 104. The means 92 are, of course, simply telescoped upon the locating pins 90 or, in the alternative, the locating pins 90 are simply inserted downwardly (or upwardly) through the openings 91, 105 after which the clip 93 and a similar clip 106 are secured in the manner shown in FIG. 9 to maintain the components and a spacer member 107 carrying a guide bar 108 in assembled relationship. The triple functioning of the means 92 replaces three functions performed by the separate platforms 44, the separate spacers 50 and the separate rails 51 since each single means 92 defines a rail portion 103, a platform supporting portion 102, and spacer means 101. Thus, whether formed from one or two plates, both of which are illustrated in FIG. 9, the means 92 provide an efficient structure which is highly adapted for quick assembly or disassembly.

In order to assure additional reinforcement a pipe 110 (FIGS. 9 and 10) is received in the bores 89 of the first spacer or support means 85 and are locked therein by suitable pins 111 received in openings 112, 113 of the spacer means 85 and the pipe 110, respectively. The pipe 110 not only is of a length to extend between adjacent pedestals 81, but the same also passes through and is secured by pins to intermediate supports 115 (FIG. 8) which correspond in function to like intermediate supports of the conveyor assembly 10 of FIG. 1. The intermediate supports 115 are identical in construction of that portion of the assembly above the legs 82 except being of a narrower, lighter and two locating pin construction.

While preferred forms and arrangements of parts have been shown in illustrating the invention, it is to be clearly understood that various changes in detail and arrangement of parts may be made without departing from the spirit and scope of this disclosure.

I claim:

1. A modular support assembly comprising standard means for supporting in elevated position components of said assembly, said standard means having an uppermost end portion, a pair of laterally spaced upright elongated supporting members carried by said standard means uppermost end portion, first spacer means telescopically receiving said supporting members, said supporting members having upper terminal end portions projecting beyond said first spacer means, at least a pair of spaced guide rails each one of which telescopically receives one of said upper terminal end portions above said first spacer means, and said first spacer means supports said guide rails above and in spaced relationship to said uppermost end portion, and means for securing said guide rails with respect to each associated upper terminal end portion.

2. The modular support assembly as defined in claim 1 including second spacer means telescopically receiving said upper terminal end portions, and said second spacer means being disposed between and thus relatively spacing said guide rails and said first spacer means.

3. The modular support assembly as defined in claim 1 including second spacer means telescopically receiving said upper terminal end portions, said second spacer means being disposed between and thus relatively spacing said guide rails and said first spacer means, and each second spacer means and its associated guide rail being formed from the same piece of material.

4. The modular support assembly as defined in claim 1 including platform means for supporting a conveyor run, and said platform means telescopically receiving said upper terminal end portions.

5. The modular support assembly as defined in claim 1 including means spanning and being connected to the upper terminal end portions of said upright supporting members.

6. The modular support assembly as defined in claim 1 including means spanning and being connected to said upright supporting members at lower terminal end portions thereof.

7. The modular support assembly as defined in claim 1 including second spacer means telescopically receiving said upper terminal end portions, platform means for supporting a conveyor run, said platform means telescopically receiving said upper terminal end portions, and said second spacer means and said platform means being disposed between said first spacer means and said guide rails.

8. The modular support assembly as defined in claim 1 including upper and lower platform means for supporting a conveyor run, and said upper platform means telescopically receiving said upper terminal end portions.

9. The modular support assembly as defined in claim 1 wherein said supporting members have lower terminal end portions, and said upper and lower terminal end portions include thread means with said upper terminal end portion thread means in part defining said securing means.

10. The modular support assembly as defined in claim 2 including platform means for supporting a conveyor run, and said platform means telescopically receiving said upper terminal end portions and being disposed between said first and second spacer means.

11. The modular support assembly as defined in claim 2 including lower platform means for supporting a conveyor run.

12. The modular support assembly as defined in claim 2 including means spanning and being connected to the upper terminal end portions of said upright supporting members.

13. The modular support assembly as defined in claim 2 wherein said standard means is a vertical pedestal, a base plate secured atop said pedestal, and means for securing said base plate to lower terminal end portions of said supporting members.

14. The modular support assembly as defined in claim 4 wherein said platform means are defined by a pair of spaced plates with each plate receiving one of said pair of supporting members.

15. The modular support assembly as defined in claim 4 wherein said standard means is a vertical pedestal, a base plate secured atop said pedestal, other platform means for supporting a conveyor run positioned atop said base plate, and means for securing said base plate to lower terminal end portions of said supporting members.

16. The modular support assembly as defined in claim 7 including other platform means below said first-mentioned platform means for supporting another conveyor run, said standard means is a vertical pedestal, a base plate secured atop said pedestal, and means for securing said base plate to lower terminal end portions of said supporting members.

17. A modular support assembly comprising a vertical pedestal, a pair of spaced upright supporting members each having upper and lower terminal end portions, means coupling said lower terminal end portions to said pedestal, first spacer means above said pedestal and telescopically receiving said supporting members, platform means above said first spacer means for supporting a conveyor run thereupon, said platform means telescopically receive said upper terminal end portion, at least a pair of spaced guide rails each one of which telescopically receives one of said upper terminal end portions, means spanning said upper terminal end portions, and means coupling said upper terminal end portions to said spanning means.

18. The modular support assembly as defined in claim 17 wherein said pedestal includes a base plate secured there atop, and said first-mentioned coupling means secures said lower terminal end portions to said base plate.

19. The modular support assembly as defined in claim 17 wherein said first-mentioned coupling means are portions of said first spacer means.

20. The modular support assembly as defined in claim 17 including second spacer means between said first spacer means and said guide rails to space said guide rails above said first spacer means.

21. The modular support assembly as defined in claim 17 including platform means above said first spacer means for supporting a conveyor run thereupon, and second spacer means above said platform means and below said guide rails for relatively spacing said guide rails and said platform means with respect to each other.

22. A modular support assembly comprising a vertical pedestal, a pair of spaced upright supporting members each having upper and lower terminal end portions, means coupling said lower terminal end portions to said pedestal, first spacer means above said pedestal end telescopically receiving said supporting members, platform means above said first spacer means for supporting a conveyor run thereupon, said platform means telescopically receive said upper terminal end portion, at least a pair of spaced guide rails each one of which telescopically receives one of said upper terminal end portions, means spanning said upper terminal end portions, and means coupling said upper terminal end portions to said spanning means, first and second platform means above said first spacer means, said first and second platform means having a common central platform portion, and said first spacer means includes an upstanding boss underlyingly supporting said common central platform portion.

23. The modular support assembly as defined in claim 20 wherein said second spacer means are annular sleeves and said upright supporting memeber are cylindrical rods.

24. The modular support assembly as defined in claim 20 including platform means for supporting a conveyor run telescopically receiving said supporting members and being sandwiched between said first and second spacer means.

25. The modular support assembly as defined in claim 21 wherein said second spacer means are annular sleeves and said supporting members are cylindrical rods.

26. The modular support assembly as defined in claim 24 wherein said second spacer means are annular sleeves and said supporting members are cylindrical rods.

27. A modular support assembly comprising a vertical pedestal, a pair of spaced upright supporting members each having upper and lower terminal end portions; means coupling said lower terminal end portions to said pedestal, a pair of platform means for supporting a conveyor run, a pair of spacer means spacing said platform means above said supporting member lower terminal end portions, at least a pair of guide rails, means coupling one of said guide rails to one of said upright supporting members, and one each of said platform means, spacer means and guide rails being of a unitized one-piece of material construction.

* * * * *